Patented Sept. 29, 1936

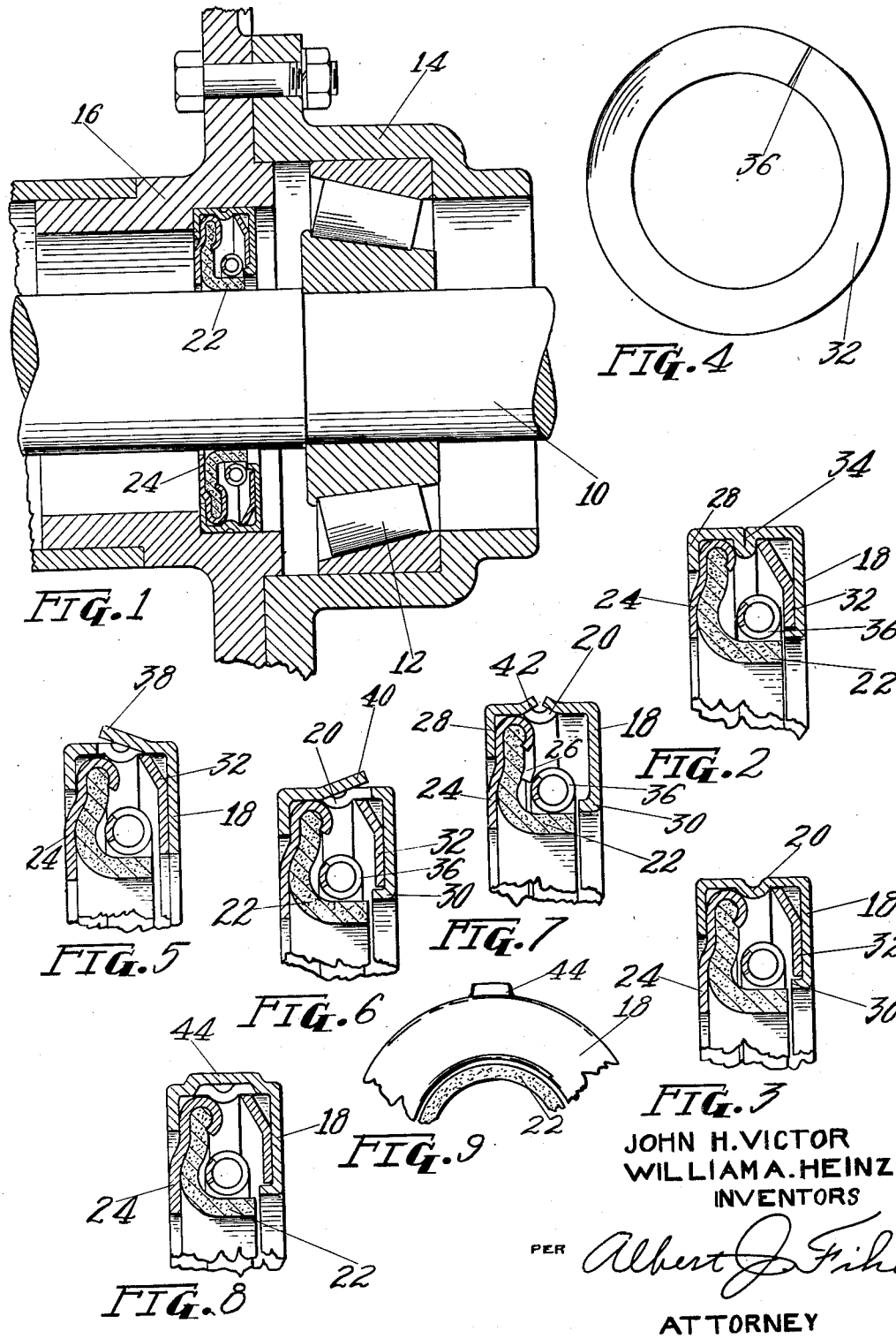

2,055,918

UNITED STATES PATENT OFFICE 2,055,918

REENFORCED GREASE RETAINER

John H. Victor, Evanston, and William A. Heinze, Chicago, Ill., assignors to Victor Manufacturing & Gasket Company, Chicago, Ill., a corporation of Illinois Application June 28, 1933, Serial No. 677,992

12 Claims. (Cl. 288—1)

This invention relates to an improved reenforced grease retainer and has for one of its principal objects the provision of means for retaining grease or oil in position in a bearing about a rotating shaft and which means shall be capable of ready assembly and also capable of easy insertion into position about the shaft.

One of the important objects of this invention is to provide a reenforced grease retainer or the like which, although made of light material, shall be of sturdy construction and not liable to become damaged upon being inserted into position about the shaft even though struck with heavy blows by a hammer or other tool.

Another and further important object of the invention resides in the provision of a reenforced element for use with grease retainers or the like which will so reenforce an ordinary thin casing that the equivalent of a heavier casing or shell results and one which accordingly combines strength with light weight and satisfactory operation.

Another and still further important object of the invention is the provision in a grease retainer of means associated therewith whereby the same will be positively retained in desired position about a shaft and in a bearing housing in such a manner so as to be centrally located and also positively prevented from undesirable rotation with the shaft.

A further object of the invention is to provide a grease retainer casing which shall have a reenforced beaded outer shell, which bead shall serve the double purpose of a stop for retaining certain parts in assembled relationship and also acting to provide additional strength for the assembly as a unit.

Other and further important objects of the invention will be apparent from the disclosures in the accompanying drawing and following specification.

The invention, in a preferred form, is illustrated in the drawing and hereinafter more fully described.

In the drawing:

Figure 1 is a sectional view of a shaft and bearing, showing the improved grease retainer of this invention applied thereto.

Figure 2 is a detail sectional view of the grease retainer.

Figure 3 is a sectional view illustrating a slight modification.

Figure 4 is a plan view of the reenforcing element.

Figure 5 is a partial sectional view of another modification of the grease retainer.

Figure 6 illustrates a further modification.

Figure 7 shows still another modified form wherein the reenforcing band is omitted.

Figure 8 is a similar sectional view, illustrating another modification. Figure 9 is a plan view of Figure 8.

As shown in the drawing:

The reference numeral 10 indicates generally a shaft, having a bearing 12 and a housing 14—16 positioned there-around, and with a grease retainer constructed in accordance with the principles of this invention mounted on the shaft and in the housing.

The grease retainer comprises essentially an outer shell 18 having an annular bead or depression 20 formed in its rim, which bead performs the double purpose of providing reenforcing strength and also acting as a stop for certain associated parts in the housing.

The shell 18 is adapted to inclose a leather washer or the like 22 which is pre-formed as shown and mounted in a supporting element 24 which comprises a circular plate of suitable sheet metal and which has its edges countersunk as illustrated. The edges are then in-turned around the edges of the leather packing element 22 and clamped into gripping relationship therewith. In Figure 7, integral further inwardly extending projections 26 of the plate 24 are shown which provide an additional gripping feature so far as the leather packing element 22 is concerned.

The shell 18 is formed with one edge upstanding, this being the edge 28 which is later swung down or turned in about the packing assembly 22—24 after the same has been inserted in the shell.

When the shell is formed, an in-turned lip 30 is preferably provided around the opening in one side which provides additional strength at a point where it is most needed, inasmuch as any battering or hammering against the assembled grease retainer to force it into position is generally directed at this point or adjacent thereto. In order to further reenforce this face of the shell and the edge 30, a metallic band 32, shaped as shown, is inserted behind this face of the shell, having its inner periphery adjacent the in-turned edge 30, and with its outer periphery adjacent the bead 20 formed in the shell. This bead may be an open groove as illustrated in most of the figures, or in the assembly of the packing into the shell, may be compressed into a doubled over portion as shown at 34 in Figure 2.

Inasmuch as the bead 34 and the in-turned edge 30 are already formed in the shell before the metal ring 32 is placed therein, the ring is split as shown at 36 so as to allow of its insertion into the shell around the inner periphery of the bead 20 or 34, whereupon the ring 32 is then spread so as to assume its original shape as illustrated in Figure 4. A tight fit is then formed between the ring and its abutments comprising one face of the bead and one face of the in-turned edge 30, whereupon a considerable reenforcing action of this face of the shell results. It will be noted in Figure 2 that the outer edge of the ring 32 is cut square, while in Figure 3, the outer edge is cut at an angle, either form being suitable for use, the angular form, however, being preferred with the open bead 20.

Before the leather packing 22 and its metal backing 24 are inserted into the shell, a garter spring 36 is positioned there-around so as to insure a suitable contact of the face of the leather packing with the shaft 10, and it will be noted that the metallic flange of the packing assembly abuts against the other face of the bead 20 or 34, after which the edge 28 of the shell is spun down in position about the countersunk portion of the metallic flange 24, thereby providing an integral unitary grease retainer which can be readily placed in position about a shaft in a bearing and without the necessity of any more assembly operations. Furthermore, the reinforced portions of the shell insure against damage due to hammering or other battering action which might be used in forcing the grease retainer into proper position.

In Figure 5 is shown a modification whereby provision is made for a better interfitting of the grease retainer with the housing 16 in the event that the housing is slightly oversize, this including a struck-up portion 38 which is formed in the shell 18 at intervals around its periphery.

In Figure 6 is shown a struck-up portion 40 forced outwardly from the shell in a different direction.

In Figure 7, two struck-up portions 42 are provided struck-out from the shell at intervals around its periphery, and in Figure 8 is shown a still further form of struck-out element. These elements will naturally be forced into very tightly fitting relationship with the inner face of the bearing and will accordingly prevent the grease retainer from undesirable turning with the shaft.

It will be evident that herein is provided a grease retainer which includes, in a light and simple construction, a satisfactory device which possesses sufficient strength to withstand assembling operations, and which is so constructed that it is economical of manufacture and simple of assembly and installation.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A grease retainer and oil seal, including an outer shell having a rim and at least one side and an interior annular bead in the rim, and a sealing element supported and positioned by one face of said bead, said sealing element comprising a pre-formed flexible packing and a reenforcing washer in the shell abutting against the bead on the face opposite from the packing.

2. A grease retainer and oil seal, including an outer shell having a rim and at least one side and an interior annular bead in the rim, and a sealing element supported and positioned by said bead, said sealing element comprising a flexible packing, and a supporting armor for the packing, said armor being fastened between the bead and one side of the shell.

3. A grease retainer and oil seal, including an outer shell having a rim and at least one side and an interior annular bead in the rim, and a sealing element supported and positioned by said bead, said sealing element comprising a flexible packing, and a supporting armor for the packing, said armor and packing irremovably mounted in the shell under stress, said mounting comprising a turned down side wall of the shell.

4. An oil seal and grease retainer, including a shell having a rim and side walls an annular in-turned ledge in the rim, and a strengthening ring sprung into position in the shell and cooperating with the ledge.

5. An oil seal and grease retainer, including a shell having a rim and side walls, means for strengthening one side wall, said means including an annular in-turned ledge on the wall, and a reenforcing ring positioned in the shell and cooperating with the ledge, together with an annular bead in the rim of the shell, said reinforcing ring adapted to be positioned between the bead and the ledge.

6. An oil seal and grease retainer, including a shell having a rim and side walls, means for strengthening one side wall, said means including an annular in-turned ledge on the wall, and a reenforcing ring positioned in the shell and cooperating with the ledge, together with an annular bead in the rim of the shell, said reenforcing ring adapted to be positioned between the bead and the ledge, the ring being dished and split for such positioning, and a flexible packing ring in the casing.

7. An oil seal and grease retainer, including a shell having a rim and side walls, means for strengthening one side wall, said means including an annular in-turned ledge on the wall, and a reenforcing ring positioned in the shell and cooperating with the ledge, together with an annular bead in the rim of the shell, said reenforcing ring adapted to be positioned between the bead and the ledge, the ring being dished and split for such positioning, and a flexible packing ring in the casing, said packing ring positioned on the side of the annular bead opposite said reenforcing ring.

8. An oil seal and grease retainer, including a shell having a rim and side walls, means for strengthening one side wall, said means including an annular in-turned ledge on the wall, and a reenforcing ring positioned in the shell and cooperating with the ledge, together with an annular bead in the rim of the shell, said reenforcing ring adapted to be positioned between the bead and the ledge, the ring being dished and split for such positioning, and a flexible packing ring in the casing, said packing ring positioned on the side of the annular bead opposite said reenforcing ring, and a supporting armor for the packing, said armor being of the same material as the casing and clamped down around the periphery of the packing.

9. An oil seal and grease retainer, including a shell having a rim and side walls, means for strengthening one side wall, said means including an annular in-turned ledge on the wall, and a reenforcing ring positioned in the shell and cooperating with the ledge, together with an annular bead in the rim of the shell, said reenforcing ring adapted to be positioned between the bead and the ledge, the ring being dished and split for such positioning, and a flexible packing ring in the casing, said packing ring positioned on the side of the annular bead opposite said reenforcing ring, and a supporting armor for the packing, said armor being of the same material as the casing and clamped down around the periphery of the packing, one wall of the casing being turned down around said supporting armor.

10. An oil seal and grease retainer, including a shell having a rim and side walls, means for strengthening one side wall, said means including an annular in-turned ledge on the wall, and a reenforcing ring positiond in the shell and cooperating with the ledge, together with an annular bead in the rim of the shell, said reenforcing ring adapted to be positioned between the bead and the ledge, the ring being split for such positioning, and a flexible packing ring in the casing, said packing ring positioned on the side of the annular bead opposite said reenforcing ring, and a supporting armor for the packing, said armor being of the same material as the casing and clamped down around the periphery of the packing, one wall of the casing being turned down around said supporting armor, and a garter spring positioned about the flexible packing adjacent the reenforcing ring.

11. An oil seal and grease retainer, including a casing having a top, base, and side, means for reenforcing the base, said means including an annular in-turned ledge on the base, and a strengthening ring positioned behind the base and cooperating with the ledge, together with an annular bead in the side of the casing, said reenforcing ring adapted to be positioned between the bead and the ledge, the ring being split for such positioning, and a flexible packing ring in the casing, said packing ring positioned on the side of the annular bead opposite said reenforcing ring, and a supporting armor for the packing, one wall of the casing being turned down around said supporting armor, and means in the shell for tightly positioning the same in a housing.

12. A grease retainer comprising a flanged shell, a packing ring having a tubular portion and a radially extending portion, an armor binding about the marginal edge of the radial portion of the packing and securely fastened in the shell against one flange thereof, a spring urging the tubular portion of the packing into leak-proof engagement with a relatively movable member, and reenforcing means in the shell, said reenforcing means positioned against the other flange thereof.

JOHN H. VICTOR.
WILLIAM A. HEINZE.